(12) United States Patent
Maguire, III et al.

(10) Patent No.: US 7,117,430 B2
(45) Date of Patent: Oct. 3, 2006

(54) SPREADSHEET ERROR CHECKER

(75) Inventors: Justin M. Maguire, III, Seattle, WA (US); Keith Mears, Seattle, WA (US); May Novack, Kirkland, WA (US); Eric W. Patterson, Issaquah, WA (US); Marcella Rader, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 851 days.

(21) Appl. No.: 09/794,595

(22) Filed: Feb. 27, 2001

(65) Prior Publication Data
US 2002/0161799 A1 Oct. 31, 2002

(51) Int. Cl.
*G06F 15/00* (2006.01)

(52) U.S. Cl. ..................... 715/503; 715/504
(58) Field of Classification Search ............... 715/503, 715/504, 500, 509
See application file for complete search history.

(56) References Cited

U.S. PATENT DOCUMENTS

| | | | | |
|---|---|---|---|---|
| 5,247,611 A * | 9/1993 | Norden-Paul et al. | ...... | 715/504 |
| 5,418,902 A * | 5/1995 | West et al. | ...... | 715/503 |
| 5,603,021 A * | 2/1997 | Spencer et al. | ...... | 707/4 |
| 5,633,998 A * | 5/1997 | Schlafly | ...... | 714/1 |
| 5,657,259 A * | 8/1997 | Davis et al. | ...... | 708/204 |
| 5,721,847 A * | 2/1998 | Johnson | ...... | 345/786 |
| 5,842,180 A * | 11/1998 | Khanna et al. | ...... | 705/30 |
| 5,852,824 A * | 12/1998 | Brown | ...... | 707/6 |
| 6,225,996 B1 * | 5/2001 | Gibb et al. | ...... | 715/784 |
| 6,256,649 B1 * | 7/2001 | Mackinlay et al. | ...... | 715/503 |
| 6,317,758 B1 * | 11/2001 | Madsen et al. | ...... | 715/504 |
| 6,336,590 B1 * | 1/2002 | Kubitz | ...... | 235/479 |
| 6,460,059 B1 * | 10/2002 | Wisniewski | ...... | 715/503 |
| 6,473,523 B1 * | 10/2002 | Newman et al. | ...... | 382/176 |
| 6,549,878 B1 * | 4/2003 | Lowry et al. | ...... | 715/503 |
| 6,592,626 B1 * | 7/2003 | Bauchot et al. | ...... | 715/503 |
| 6,631,380 B1 * | 10/2003 | Cason et al. | ...... | 707/102 |
| 6,631,497 B1 * | 10/2003 | Jamshidi et al. | ...... | 715/514 |
| 6,640,234 B1 * | 10/2003 | Coffen et al. | ...... | 715/538 |
| 6,986,099 B1 * | 1/2006 | Todd | ...... | 715/503 |
| 2001/0007988 A1 * | 7/2001 | Bauchot et al. | ...... | 707/100 |
| 2002/0004801 A1 * | 1/2002 | Todd | ...... | 707/503 |
| 2002/0010713 A1 * | 1/2002 | Egilsson | ...... | 707/504 |
| 2002/0023105 A1 * | 2/2002 | Wisniewski | ...... | 707/503 |
| 2004/0225957 A1 * | 11/2004 | Egilsson | ...... | 715/503 |
| 2005/0182709 A1 * | 8/2005 | Belcsak et al. | ...... | 705/38 |
| 2006/0101326 A1 * | 5/2006 | Todd | ...... | 715/503 |

OTHER PUBLICATIONS

Boyce et al., Using Microsoft Office 97, Que Corporation 1997, pp. 242-243, 305-306, 328-330.*
Anonymous, Use Excel's Auditing Tools to Check Formulas and Track down Errors, Inside Microsoft Excel, Oct. 2000, vol. p. 7, 5 pgs.*

(Continued)

*Primary Examiner*—Cong-Lac Huynh
(74) *Attorney, Agent, or Firm*—Merchant & Gould

(57) ABSTRACT

An error checker identifies spreadsheet errors by traversing a spreadsheet cell-by-cell and comparing each cell's contents to a list of error rules. When a cell's contents satisfy an error rules, then the cell is identified as containing a potential spreadsheet error. The error checker identifies potential spreadsheet errors and marks the cells containing the potential errors with an error indicator. A drop-down menu is provided that includes an element identifying the error rule that was invoked by the cell's contents and may include one or more recommended actions to resolve the identified error.

21 Claims, 8 Drawing Sheets

OTHER PUBLICATIONS

Rothermel et al., WYSIWYT Testing in the Spreadsheet Paradigm: An Empirical Evaluation, ACM 2000, pp. 230-239.*

Cox et al., Using Visual Programming to Extend the Power of Spreadsheet Computation, ACM 1994, pp. 153-161.*

Rothermael et al., WYSIWYT Testing in the Spreadsheet Paradigm: An Empirical Evaluation, ACM 2000, pp. 230-239.*

Brown et al., An Experimental Study of People Creating Spreadsheets, ACM 1987, p. 258-272.*

*Modeling spreadsheet audit: A rigorous approach to automatic visualization*; J. Sajaniemi; *Journal of Visual Languages and Computing*, 2000, vol. 11, No. 1 (Feb.) pp. 49-82.

*Efficient methods for checking integrity: an integrated spreadsheet engineering methodology (ISHEM)*; K. Rajalingham, D. Chadwick, B. Knight and D. Edwards; *Integrity and Internal Control in Information Systems: Strategic Views on the Need for Control (Proceedings of 3rd International Working Conference on Integrity and Internal Control in Information Systems)*, 2000, pp. 41-58.

*Spreadsheet model verification*; A.W. Wakelin; *Proceedings of the 4th Software Quality Conference*, 1995, pp. 310-317 vol. 2.

*Unspoken nightmare: 'Stupid' spreadsheets*; R. Moskowitz, *Software News*, May 1997, vol. 7, No. 5, p. 51.

*Bug-proofing your spreadsheets*; M. Bryan; *Business Software*, Dec. 1986, vol. 4, No. 12, pp. 38-41.

*Reviewing electronic spreadsheets*; L. Beitman; *EDPACS*, Apr. 1986, vol. 13, No. 10, pp. 8.

* cited by examiner

Fig. 8

| Rule Num. (802) | Error Type (804) | UOC Error String (806) | Dialog Error String (808) | First Recommended Command (810) | Second Recommended Command (812) | Recomm. 2 (propagated error) (814) |
|---|---|---|---|---|---|---|
| 1A | #DIV/0! | Divide by Zero Error | Divide by Zero Error: The formula or function used is dividing by zero or empty cells. | Help on this error | Show Calculation Steps (Formula Evaluator) | Trace Error |
| 1B | #N/A | Value Not Available Error | Value Not Available Error: A value is not available to the formula or function | Help on this error | Show Calculation Steps (Formula Evaluator) | Trace Error |
| 1C | #NAME? | Invalid Name Error | Invalid Name Error. The formula contains unrecognized text. | Help on this error | Show Calculation Steps (Formula Evaluator) | Trace Error |
| 1D | #NULL! | Null Error | Null Error: The ranges in the formula do not intersect. | Help on this error | Show Calculation Steps (Formula Evaluator) | Trace Error |
| 1E | #NUM! | Number Error | Number Error: There is a problem with a number used in the formula. | Help on this error | Show Calculation Steps (Formula Evaluator) | Trace Error |
| 1F | #REF! | Invalid Cell Reference Error | Invalid Cell Reference Error: Moving or deleting cells caused invalid cell reference, or function is returning reference error. | Help on this error | Show Calculation Steps (Formula Evaluator) | Trace Error |
| 1G | #VALUE! | Error in Value | Error in Value: A value used in the formula is of the wrong data type. | Help on this error | Show Calculation Steps (Formula Evaluator) | Trace Error |
| 2 | Reference to Empty Cell | Formula refers to empty cells | Formula refers to empty cells: The formula in this cell refers to cells that are currently empty. | Trace Empty Cell* | Help on this error | NA |
| 3 | Number stored as text | Number Stored as Text | Number Stored as Text: The number in the cell is formatted as text or preceded by an apostrophe. | Convert to Number* | Help for converting ranges | NA |
| 4 | Formula omits adjacent cells | Formula omits adjacent cells | Formula omits adjacent cells: The formula in this cell refers to a range that has additional numbers adjacent to it. | Update Formula to include Cells | Help on this error | NA |
| 5 | Inconsistent Formula | Inconsistent Formula | Inconsistent Formula: The formula in this cell differs from the formulas in this area of the spreadsheet | Copy Formula from Above (Left) | Help on this error | NA |
| 6 | Text Dates with 2-digit year. | Text Date with 2-digit year. | Text Date with 2-digit year: This cell contains a date string represented with only 2 digits for the year. | Convert XX to 19XX | Convert XX to 20XX | NA |
| 7 | Unprotected cell containing formula | Unprotected Formula | Unprotected Formula: This cell contains a formula and is not locked to protect it from being changed inadvertently. | Lock cell | Help on this error | NA |

SPREADSHEET ERROR CHECKER

FIELD OF THE INVENTION

The present invention generally relates to checking computer spreadsheets for user entry errors. More particularly, the present invention relates to an automated spreadsheet error checker that identifies potential spreadsheet errors and suggests solutions thereto.

BACKGROUND OF THE INVENTION

Many businesses rely on spreadsheet applications like Microsoft Excel, marketed by Microsoft Corporation of Redmond, Wash., to manage critical aspects of their business processes. However, research indicates that 30% of spreadsheets contain user errors, and 1% of the cells used in those spreadsheets contain user errors. It is common for users to make mistakes when creating spreadsheets and difficult for users to recognize and correct the mistakes. Small spreadsheets are just as likely to contain errors as large spreadsheets. Spreadsheets created by more advanced users are just as likely to contain errors as those created by novices. Widespread reporting of spreadsheet error research may cause customers to question the validity of results in spreadsheets, and the use of a spreadsheet as a platform for critical applications.

Currently available spreadsheets identify impracticable calculation errors, by replacing a cell's contents with an error flag. Impracticable calculation errors are those errors that are caused by a spreadsheet formula calculation that simply cannot be made, such as a formula including a divide by zero calculation or a formula including a reference to an invalid cell. However, many spreadsheet errors exist that are not so easily identifiable. For example, some errors reside in a formula that can be calculated and represented as a value. Other errors are simply values that have been mis-entered, such as a text value that should have been entered as a number. Many spreadsheet errors are not impracticable calculation errors, but, nonetheless, result in an erroneous calculation. These errors are referred to as defective calculation errors. As such, these errors do not generate an error flag in conventional spreadsheets, but can cause serious flaws in the spreadsheet's operations. Defective calculation errors include formulas with typographical errors and numbers that are meant to be formatted as numbers, but are improperly formatted as text.

Therefore, there is a need in the art for an error checker capable of recognizing spreadsheet errors and assisting in the correction of those errors. The error checker should identify both impracticable calculation errors and defective calculation errors. The help facility should also function to recommend solutions to an identified error and enable the display of more comprehensive help and debugging information regarding the error.

SUMMARY OF THE INVENTION

The present invention meets the above-described needs by providing an error checker that identifies both impracticable calculation errors and defective spreadsheet errors. The error checker identifies the errors by traversing a spreadsheet cell-by-cell and comparing each cell's contents or value to a list of error rules. When a cell's contents satisfy or match an error rule, then the cell is identified as potentially containing an error. The error checker operates in both background and foreground modes.

In one aspect of the present invention, the error checker identifies potential errors that meet error rules for the following types of spreadsheet errors: cells containing formulas that evaluate to an impracticable error; formulas referring to empty cells; numbers stored as text; formulas that omit cells; inconsistent formulas in a region; cells containing text dates with 2 digit years; and unlocked cells containing formulas.

In another aspect of the present invention, the error checker operates in a background mode to identify potential spreadsheet errors and to mark the cells containing the errors with an error indicator. A user can access a drop-down menu to select from various menu elements that can resolve the error. First, the menu includes an element identifying the error rule that was invoked by the cell's contents. Second, the menu includes one or more recommended actions to eliminate the identified error. Third, the menu includes a command to ignore the error. Fourth, the menuincludes a selection for accessing the cell to edit the cell's contents. Fifth, the menu includes a means for displaying a formula auditing toolbar that provides a debugging utility for evaluating and modifying a formula. Finally, the menu includes a means for modifying the error checking options to, for example, turn off error checking.

In background mode, the error indicator can be removed when a user resolves the identified error either through modifying the cell's contents, modifying the contents of related cells, or by choosing to ignore the error. In a case where more than one error is identified within a particular cell, the indicator will not be removed until all applicable errors have been resolved.

In still another aspect of the present invention, the error checker operates in a foreground mode that is invoked when a user affirmatively chooses to commence error checking, usually by selecting error checking from the main menu of a spreadsheet application. In foreground mode, the error checker traverses the spreadsheet cell-by-cell applying the above-described error rules to each cell. When an error is identified, a dialog box is displayed prompting the user to resolve the error. The dialog box enables the user to select recommended actions, to ignore the error, to edit the cell containing the error, and to change the error checking options. In addition, the foreground mode's dialog box enables the user to navigate between identified errors, by providing buttons that move the error checker's focus to "previous" or "next" errors.

In yet another aspect of the present invention, the error checker's operation can be customized by use of an options dialog box. Error checker options include enabling and disabling background checking, changing the color of the error indicator, resetting ignored errors, and activating/deactivating specific error rules. The error checker of the present invention can also be accessed through a programming interface, such as Microsoft's Component Object Model to perform error checking on spreadsheets. The functionality of the error checker is exposed through an Errors Object that can receive a cell range and an error type and can return the error state (true/false) of the cell in the range. Additionally, the error checking options can be individually turned on/off through the component object model.

The various aspects of the present invention may be more clearly understood and appreciated from a review of the following detailed description of the disclosed embodiments and by reference to the drawings and claims.

BRIEF DESCRIPTION OF THE DRAWINGS

FIG. 8 depicts a spreadsheet error table that matches an exemplary list of spreadsheet error types with exemplary recommended commands.

DETAILED DESCRIPTION

An error checker of an exemplary embodiment of the present invention identifies spreadsheet errors by traversing a spreadsheet cell-by-cell and comparing each cell's contents to a list of error rules. When a cell's contents satisfy an error rule, then the cell is identified as containing a potential spreadsheet error. The error checker operates in both background and foreground modes.

In background mode, the error checker identifies potential spreadsheet errors and marks the cells containing the potential errors with an error indicator. A drop-down menu is provided that includes an element identifying the error rule that was invoked by the cell's contents and may include one or more recommended actions to resolve the identified error. The menu can also include selections for referencing a help facility for more information about the identified error, ignoring the error, accessing the cell to edit the cell's contents, and accessing a debugging utility for evaluating and modifying a spreadsheet formula. In background mode, the error indicator can be removed when a user resolves all identified errors either through modifying the cell's contents, modifying the contents of related cells, or by choosing to ignore the error.

Foreground mode is invoked when a user affirmatively chooses to commence error checking, usually by selecting error checking from the main menu of a spreadsheet application. In foreground mode, the error checker traverses the spreadsheet cell-by-cell applying the spreadsheet error rules to each cell. When an error is identified, a dialog box is displayed prompting the user to dispose of the error and providing selectable commands to dispose of the error. The focus of the error checker can be moved from error to error by use of the error checker's navigation buttons.

Figure 1:
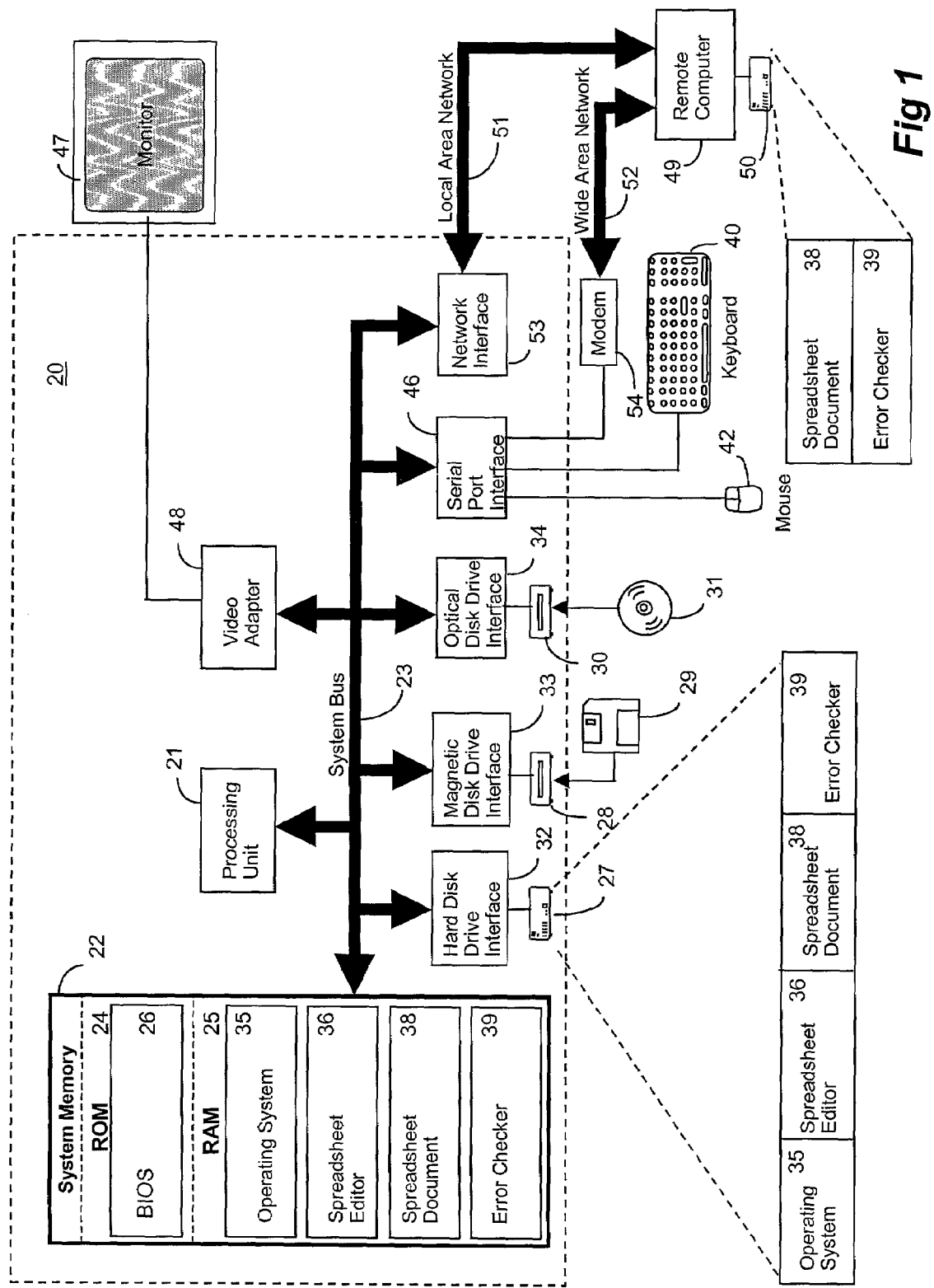
FIG. 1 is a block diagram illustrating an exemplary operating environment for implementing of the present invention.

Exemplary embodiments of the present invention will hereinafter be described with reference to the drawing, in which like numerals represent like elements throughout the several figures. FIG. 1 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20. For example, one or more data files 60 may be stored in the RAM 25 and/or hard drive 27 of the personal computer 20.

A number of program modules may be stored on hard disk 27, magnetic disk 29, optical disk 31, ROM 24, or RAM 25, including an operating system 35, a spreadsheet editor 36 (a spreadsheet application program), a spreadsheet document 38, and a error checker 39. Program modules include routines, sub-routines, programs, objects, components, data structures, etc., which perform particular tasks or implement particular abstract data types. Aspects of the present invention may be implemented in the form of an error checker program module 39 that can be incorporated into or otherwise in communication with a spreadsheet editor program module 36. The spreadsheet editor program module 36 generally comprises computer-executable instructions for creating or modifying an electronic spreadsheet document. The error checker program module 39 generally comprises computer-executable instructions for checking a spreadsheet document 38 for errors.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A display device 47 may also be connected to system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to the personal computer 20, only a memory storage device 50 has been illustrated in the figure. The logical connections depicted in the figure include a local area network (LAN) 51 and a widearea network (WAN) 52. Such networking environments are commonplace in offices, enterprise-wide computer networks, intranets, and the Internet.

When used in a LAN networking environment, the personal computer 20 is often connected to the local area network 51 through a network interface or adapter 53. When used in a WAN networking environment, the personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
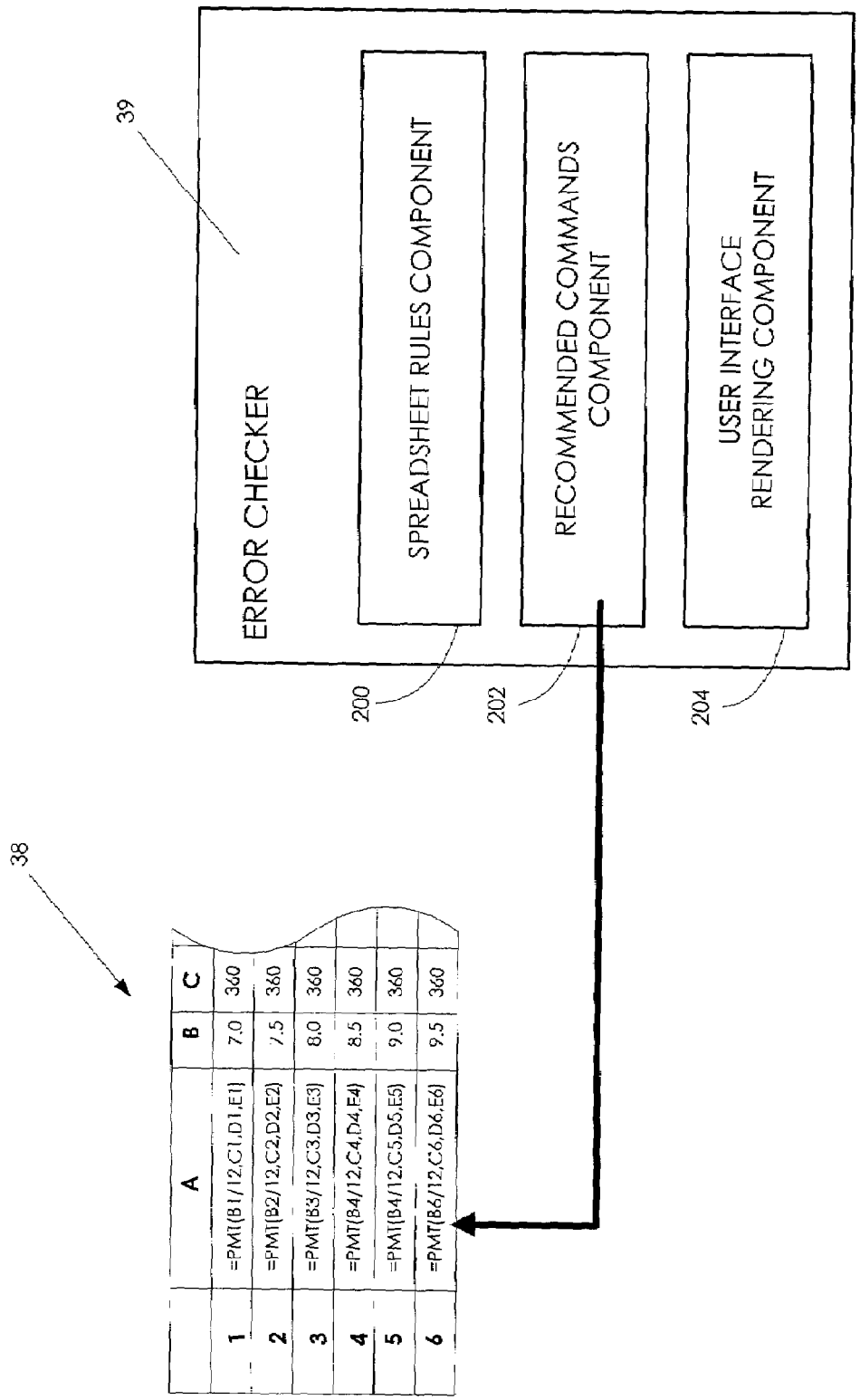
FIG. 2 is a block diagram illustrating some of the primary components of an exemplary embodiment of the error checker of the present invention, in the context of an exemplary operating environment.

FIG. 2 depicts the primary components of an error checker 39 that is an exemplary embodiment of the present invention. The error checker 39 has a spreadsheet rules component 200, a recommended commands component 202 and a user interface rendering component 204. The error checker 39 is generally used to check the cells of spreadsheet document 38 for errors.

The spreadsheet document 38 is comprised of a number of spreadsheet cells. The cells are divided into columns (A–C) and rows (1–6). In the example of FIG. 2, the spreadsheet document 38 contains a group of formulas in column A. These formulas use data from other cells to calculate a payment figure. For example, the formula in cell A1 refers to values in columns B, C, D, and E. The same is true for cells A2–A6. An error, however, exists in cell A5. Cell A5 refers to cell B4, but should refer to cell B5. This error is an inconsistency error in that the formula in cell A5 is inconsistent with its neighboring formulas in cells 4 and 6. This error is not an impracticable calculation error, because the formula of cell A5 can be calculated to generate a numeric result. This sort of error is referred to as a defective spreadsheet error.

The error checker 39 can identify this error and highlight cell A5 to indicate that cell A5 contains an error. The error checker 39 identifies the inconsistency error (or any other error) by comparing the contents of cell A5 with one or more spreadsheet rules contained in the spreadsheet rules component 200. In this example, the spreadsheet rules component 200 includes an inconsistent formula rule that would identify the formula in A5 as potentially erroneous. The error checker 39 can then match the identified spreadsheet rule to a recommended command. The recommended commands component 202 contains one or more commands that are associated with the spreadsheet rules in the spreadsheet rules component 200. The commands can be any action that resolves, ignores, or analyzes an identified error. A more detailed discussion of common recommended commands is provided in connection with FIG. 8.

The error checker 39 can operate in background and/or foreground modes. In background mode, the error checker 39 can identify a cell in the spreadsheet document 38 the contains an identified error by placing an error indicator in the cell. In background mode, the error checker 39 can check the cells of the spreadsheet document 38 in the background (i.e., transparently to the user), by traversing the cells of the spreadsheet document and comparing the contents of each cell to the spreadsheet rules in the spreadsheet rules component 200. In an alternative embodiment of the present invention, the error checker can be configured to check only visible cells (i.e., displayed cells) to conserve system resources. In this embodiment, background mode error checking can be automatically triggered when the displayed cells change when, for example, a user changes the focus to a different part of the spreadsheet.

The error checker 39 can also work in the foreground when affirmatively triggered. Typically, the error checker 39 may be operated in foreground mode in response to the selection of a menu or button command triggering a foreground error checking. In foreground mode, the error checker 39 can provide a dialog box with recommended commands made available to dispose of the identified error. More details regarding the background error checking and foreground error checking are provided in connection with FIGS. 6 and 7.

The error checker 39 also contains a user interface rendering component 204. The user interface rendering component 204 generates the on-screen information pertaining to an identified error. For example, the user interface rendering component 204 can hig light a cell that contains an identified error. The user interface rendering component 204 can also provide a drop-down menu for resolving, ignoring, or analyzing a cell containing an identified error. This cell highlighting (i.e., placing an error indicator in a particular cell) is typically done when the error checker 39 is operating in background mode.

The user interface rendering component 204 can also provide a dialog box containing recommended commands for resolving, ignoring, or analyzing a cell containing an identified error. The dialog box can also be used to navigate between errors. The dialog box can be used to navigate among errors and dispose of identified errors when the error checker is operating in foreground mode.

Figure 3:
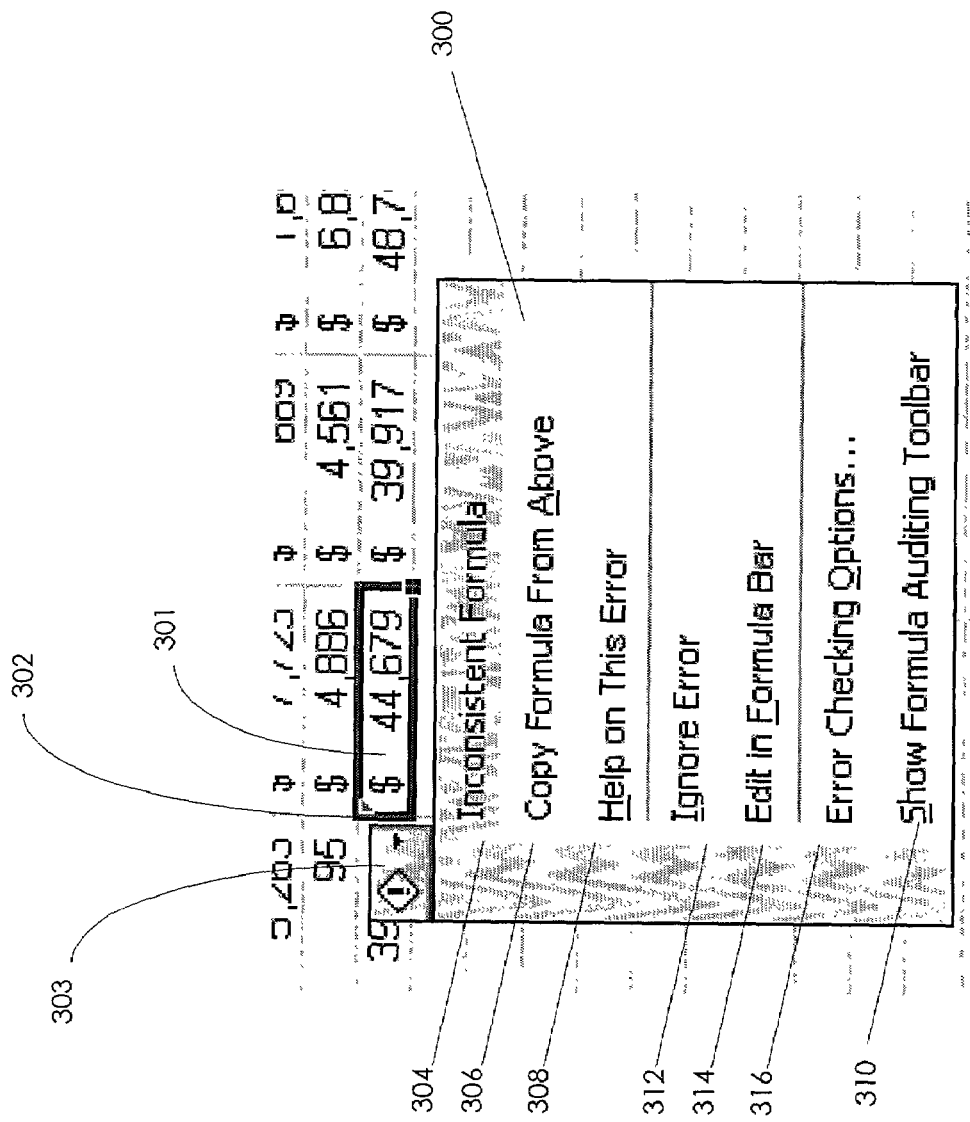
FIG. 3 depicts a drop-down menu that is generated by an exemplary error checker, operating in a background mode.

FIG. 3 depicts a drop-down menu that can be generated by the error checker 39, operating in background mode. Cell 301 has been selected, as is identified by the dark box surrounding the cell. Cell 301 has been marked with an error indicator 302. The error indicator 302 indicates that the error checker 39 has found a potential error in the contents of the cell 301. When the cell 301 has been selected, the error checker 39 can display an on-object control (OOC) button 303. When the OOC button 303 is selected, an OOC drop-down menu 300 can be displayed. The OOC drop-down menu 300 contains information about the identified error and contains selections for disposing of the identified error.

The OOC drop-down menu 300 identifies the error type of the identified error in a static command bar item 304. In the example of FIG. 3, the error type identified in the static command bar item 304 is an inconsistent formula error. In other words, the cell 301 contains a formatting property, a value and/or a formula (not shown) that matches a spreadsheet rule in the spreadsheet rules component 200. The OOC drop-down menu 300 also displays one or more recommended commands 306, 308. In the example of FIG. 3, the first recommended command 306 can copy a formula from a nearby cell, if the user selects the first recommended command from the OOC drop-down menu 300. The second recommended command 308 can provide access to a help facility to provide more information about the identified error, if the user selects the second recommended command from the OOC drop-down menu 300.

The OOC drop-down menu 300 can also include other selectable options for disposing of an identified error. The ignore error selection 312 can remove the particular identified error from consideration by the error checker. Assuming that the contents of the cell 301 do not meet any other spreadsheet error rules, the selection of the ignore error selection 312 can remove the error indicator 302 from the cell. If the cell is checked again by the error checker (whether in background or foreground mode), the error checker will not identify the error, because the cell 301 will be marked so that the error checker 39 can recognize that it is to ignore that particular error in that cell. Of course, if other errors are identified in the cell 301, then the error checker can display the error indicator 302 to identify those errors, regardless of the status of the ignored error.

The edit in formula bar selection 314 permits the user to modify the contents of the cell 301 in the formula bar. The formula bar is a well-known tool for editing the contents of a spreadsheet cell.

The error checking options selection 316 can display a dialog box for modifying the preferences that control the operation of the error checker 39. More detail is provided about the error checking options in connection with FIG. 5.

The show formula auditing toolbar selection 310 can provide access to a formula auditing toolbar (not shown) that can permit a formula to be analyzed on a step-by-step and/or calculation-by-calculation basis. The formula auditing toolbar is a well-known tool for analyzing spreadsheet formulas.

Figure 4:
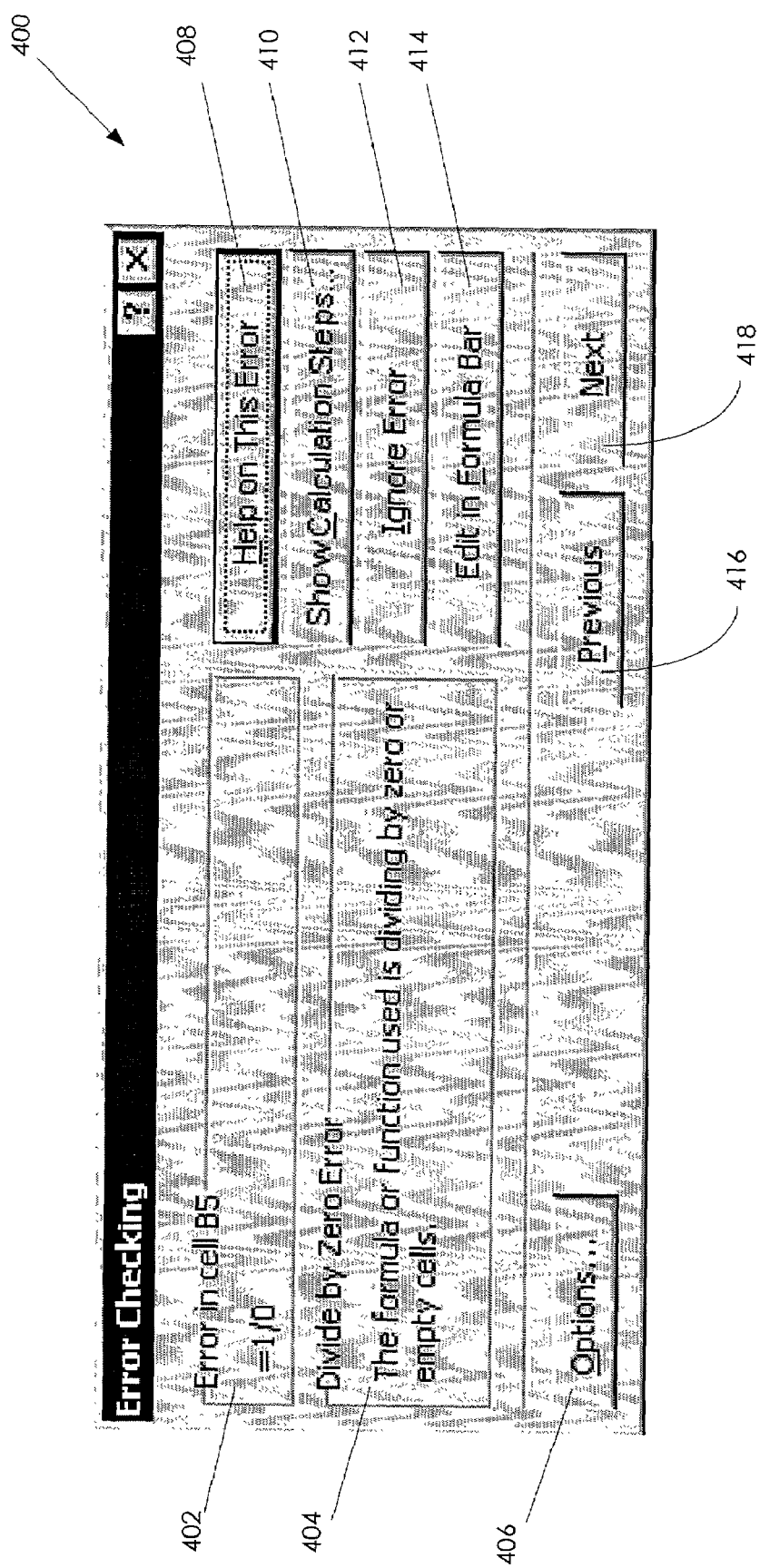
FIG. 4 depicts a dialog box that is generated by an exemplary error checker, operating in a foreground mode.

FIG. 4 depicts a dialog box that can be generated by the error checker 39, operating in the foreground mode. The error checking dialog box 400 has an error cell text box 402 that identifies the cell in which an identified error resides. The error cell text box 402 can also display the contents of the cell. In the example of FIG. 4, the identified error resides in cell B5 which contains the formula "=1/0". The error checking dialog box 400 identifies the error type in an error type box 404. In the example of FIG. 4, the identified error is a divide by 0 error. The error type box 404 can also provide a dialog error string that describes the error in text.

As with the OOC drop-down menu 300, the error checking dialog box 400 includes selections for disposing of the identified error. The error checking dialog box 400 includes a help button 408 that provides access to a help facility for more information on the identified error. The error checking dialog box 400 also includes a show calculation steps button 410, which can help the user locate the error in the formula by showing the last successful calculation step before an error results. Finally, the error checking dialog box 400 includes an ignore button 412, an edit in formula bar button 414, and an error checking options button 406, which operate identically to the corresponding selections in the OOC drop-down menu 300.

The error checking dialog box 400 also includes a previous navigation button 416 and a next navigation button 418. The previous navigation button 416 will move the focus of the error checker 39 to the first error that precedes the error under current consideration. Selecting the previous navigation button 416 can leave the error flags for the currently considered cell unchanged. The next navigation button 418 changes the focus of the error checker 39 to the next error following the cell under current consideration by the error checker. When either of the previous navigation button 416 or the next navigation button 418 is pressed, the error checking dialog box 400 is updated to reflect the error type and recommended commands of the cell to which the error checker 39 has been directed and the appropriate cell (containing the error) is selected. If no previous or next error exists when either the previous navigation button 416 or the next navigation button 418 is selected, then a dialog box indicating that the error checking is complete can be displayed.

Figure 5:
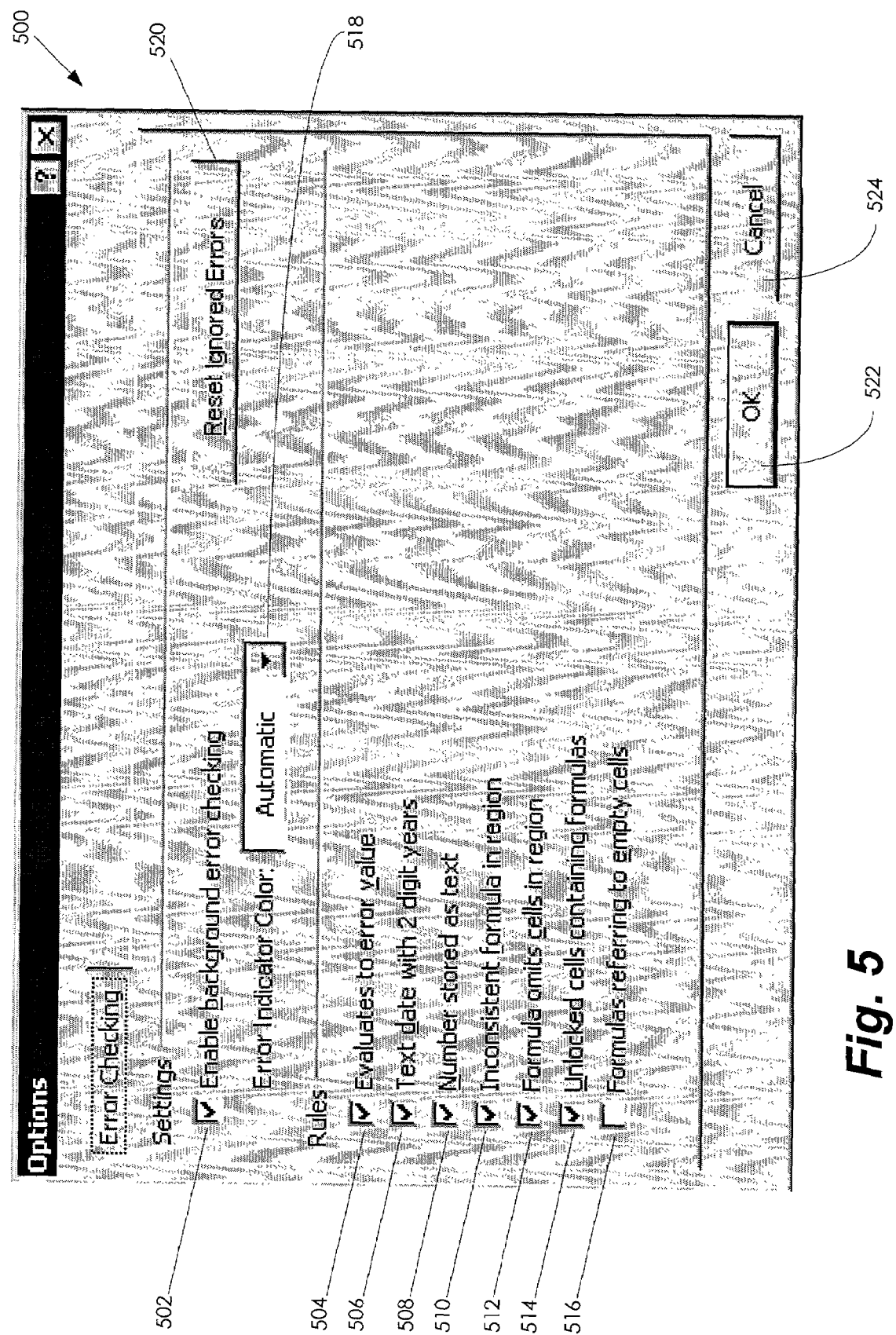
FIG. 5 depicts an options dialog box that is used to modify preferences for an exemplary error checker.

FIG. 5 depicts an options dialog box 500 that can be used to modify preferences for an error checker that is an exemplary embodiment of the present invention. As described above in connection with FIG. 3, the error checking options selection 316 can display the options dialog box 500. In addition, the options dialog box may be accessed through other means, such as accessing a general options dialog box, hosted, for example, by the spreadsheet editor 36 (FIG. 1). The options dialog box 500 includes an enable check box 502 for enabling and disabling background error checking. When the enable check box is selected, the error checker 39 will perform background error checking. When the enable check box is de-selected (i.e., not checked), the error checker 39 will not perform background error checking.

The options dialog box 500 also includes a reset ignored errors button 520. When the reset ignored errors button 520 is pressed, the error checker can reset any errors that were marked as ignored in either foreground or background error checking of the current spreadsheet document. That is, the error checker can operate as if the ignore error button 412 on the error checking dialog box 400 and the ignore error selection 312 in the OOC drop-down menu 300 had never been selected for any errors in the spreadsheet document. Thus, all previously ignored errors would be reconsidered by the error checker, if a spreadsheet error rule match is found.

The options dialog box 500 also includes a drop-down menu 518 for selecting an error indicator color. The color of the error indicator 302 (FIG. 3) can be changed to a user's preference by use of the error indicator color drop-down menu 518.

The options dialog box 500 also includes check boxes for each of the spreadsheet rules in the spreadsheet component 200. Each of the spreadsheet rules can be enabled and disabled through the use of the rules check boxes 504–516. In the example of FIG. 5, all of the rules in the spreadsheet rules component 200 are selected, except for the "Formulas referring to empty cells" rule. The rule check box 516 for this rule has been de-selected, thereby disabling this rule. As a result, the error checker 39 will not consider whether cells in the spreadsheet document 38 violate this spreadsheet error rule. Those skilled in the art will appreciate that any number of spreadsheet error rules could be utilized by the error checker 39. The rules listed in FIG. 5 and throughout this application are meant to be illustrative only and additional rules will be obvious to those skilled in the art.

The choices made by use of the options dialog box 500 can be applied to the spreadsheet document 38 and/or the error checker 39 by selection of the OK button 522. On the other hand, selecting the cancel button 524 can generally negate any selections made to the open options dialog box 500. However, when the reset ignored errors button 520 is selected, the effect can be immediate, regardless of whether the cancel button 524 is subsequently selected.

Figure 6:
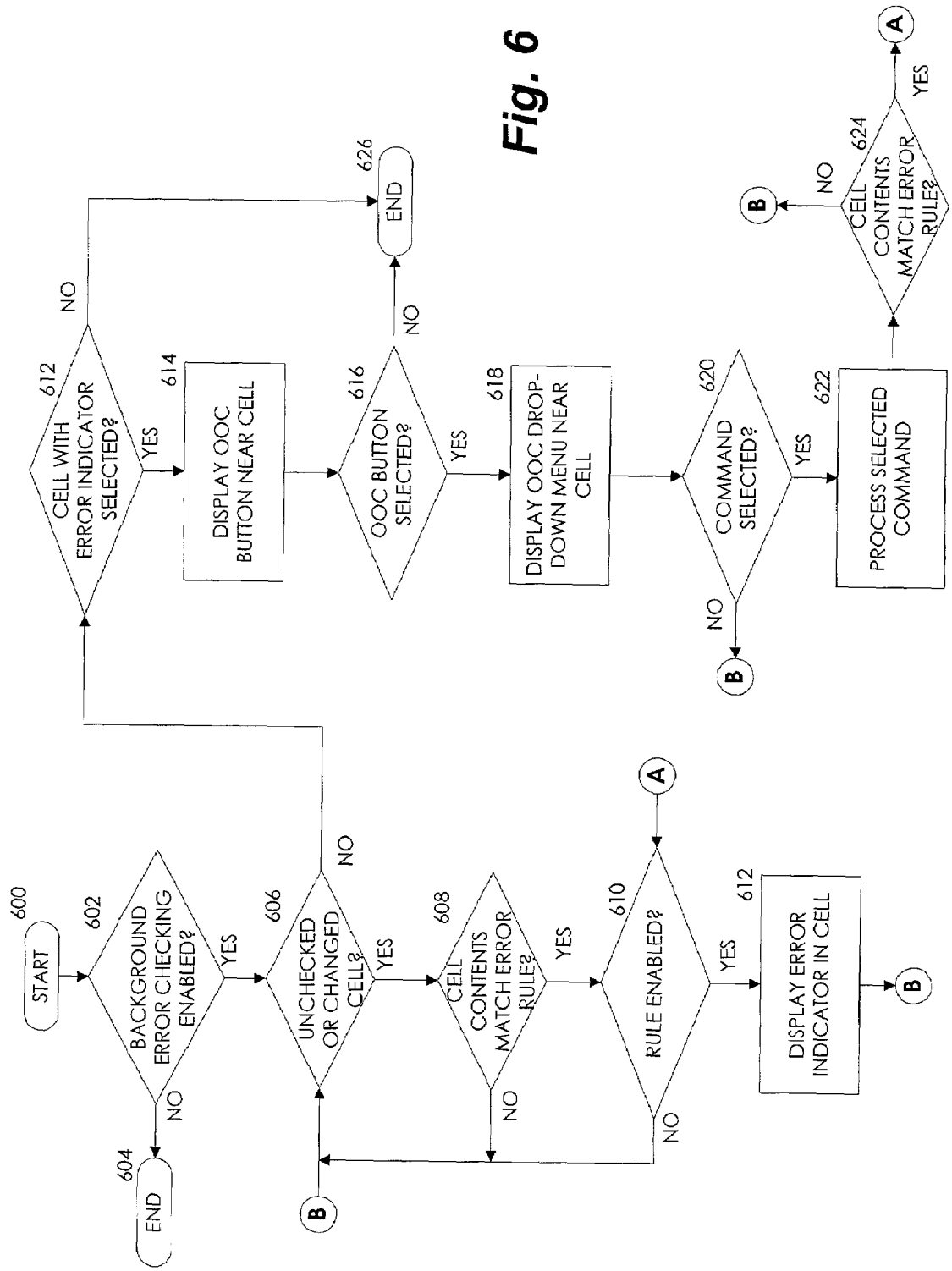
FIG. 6 is a flow chart depicting a method for background error checking that is an exemplary embodiment of the present invention.

FIG. 6 is a flow chart depicting a method for background error checking that is an exemplary embodiment of the present invention. The method begins at step 600 and proceeds to decision block 602. At decision block 602, a determination is made as to whether the background error checking has been enabled. If the background error checking has not been enabled, then the method branches to step 604 and ends. If, on the other hand, the background error checking is enabled, the method branches to decision block 606.

At decision block 606, a determination is made as to whether any unchecked or changed cells exist. If a cell exists that is either unchecked or changed, the method will branch to decision block 608. At decision block 608, a determination is made as to whether the contents of the cell match a spreadsheet error rule. If the cell contents do not match an error rule, then the method branches to step 606 to check for other unchecked or changed cells. If, on the other hand, the contents of the cell match a spreadsheet error rule, then the method branches to decision block 610.

At decision block 610, a determination is made as to whether the spreadsheet error rule for which a match was determined has been enabled. If the rule has not been enabled, then the method branches to decision block 606 to check for other unchecked or changed cells. If, on the other hand, the spreadsheet error rule has been enabled, then the method branches to step 612 and an error indicator is displayed in the cell. The method then proceeds to decision block 606 to check for any other unchecked or changed cells.

Those skilled in the art will appreciate that the sequence of decision blocks 608 and 610 can be modified such that only rules that have been enabled are compared with the contents of any unchecked or changed cells. By comparing a cell's contents with only enabled rules, time and resources can be conserved.

Returning now to decision block 606, if a determination is made that no unchecked or changed cells exist, the method will branch to decision block 612. At decision block 612, a determination is made as to whether a cell having an error indicator has been selected. If no such cell has been selected, then the method proceeds to step 626 and ends. If, on the other hand, a cell having an error indicator has been selected, the method proceeds from decision block 612 to step 614. At step 614, an on-object control (OOC) button is displayed near the cell. The method then proceeds to decision block 616, wherein a determination is made as to whether the control button is selected. If the OOC button is not selected, the method proceeds to step 626 and ends. If, on the other hand, the OOC button is selected, the method branches to step 618 and an OOC drop-down menu is displayed near the cell. The method then proceeds to decision block 620.

In an alternative embodiment of the present invention, the determination of decision block 612 (i.e., whether a cell with an error has been selected) can be made immediately after a positive determination of decision block 606 that at least one cell contains an error. In this alternative embodiment, the control button can be displayed near the appropriate cell prior to checking all of the cells for errors.

At decision block 620, a determination is made as to whether a command has been selected from the OOC drop-down menu. If no command is selected, then the method branches to decision block 606, via connectors B. If, on the other hand, a command is selected from the OOC drop-down menu, the method branches to step 622. At step 622, the selected command is processed, as described in connection with FIGS. 3 and 4. A selected command may include a recommended command to resolve the error, a command to access an error facility, a command to ignore the error, or any other such command. The method proceeds from step 622 to decision block 624.

At decision block 624, a determination is made as to whether the contents of the cell match a spreadsheet error rule. Despite the fact that the selected command has been processed, the cell is checked again at decision block 624 to accommodate situations in which a cell has violated multiple spreadsheet error rules. If a match is found with another spreadsheet error rule, the method branches to decision block 610, via connectors A and proceeds as described above. If, on the other hand, the cell contents do not match an error rule, the method branches to decision block 606, via connectors B.

Figure 7:
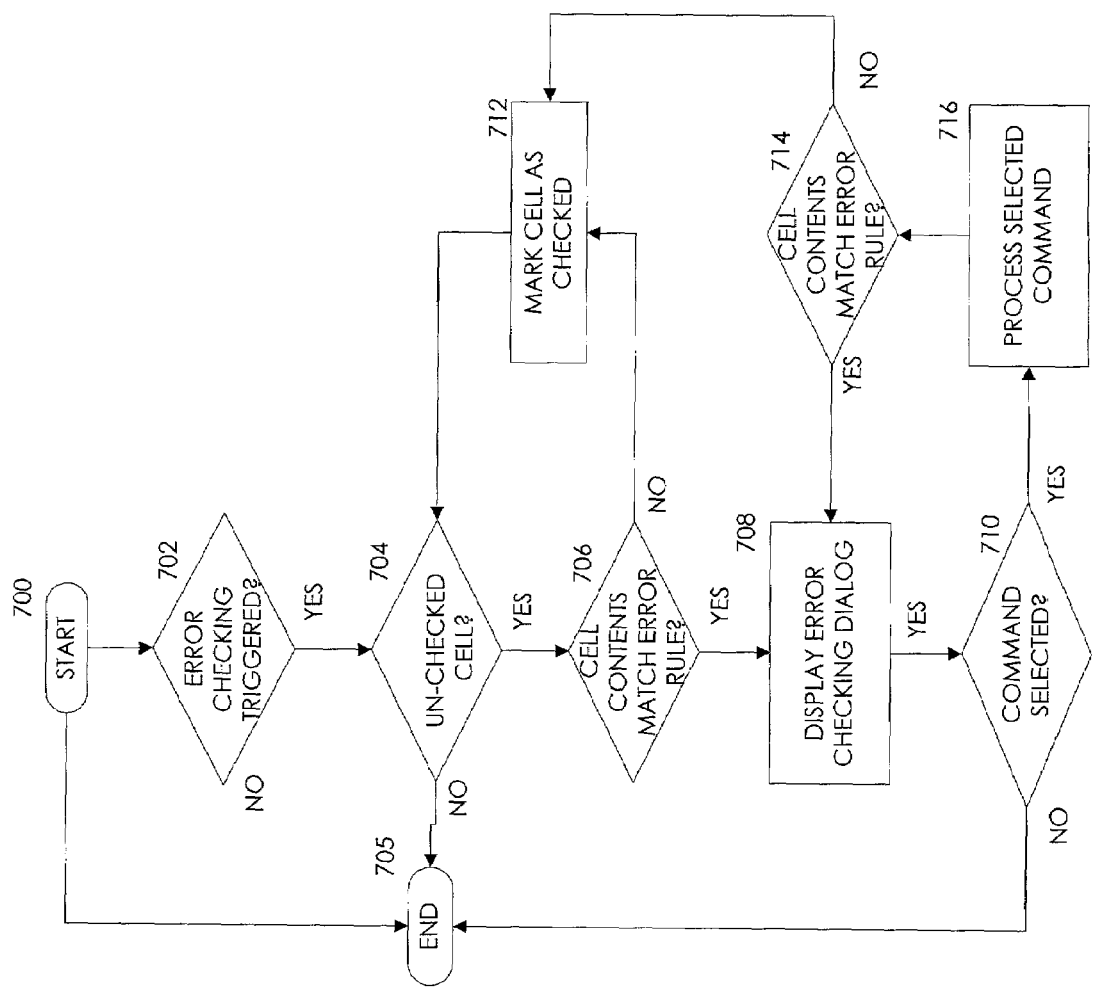
FIG. 7 is a flow chart depicting a method for foreground error checking that is an exemplary embodiment of the present invention.

FIG. 7 is a flow chart depicting a method for foreground error checking that is an exemplary embodiment of the present invention. The method begins at step 700 and proceeds to decision block 702. At decision block 702, a determination is made as to whether foreground error checking has been triggered. As described above, in connection with FIG. 5, foreground error checking can be triggered in a variety of ways including menu commands and button commands. If error checking has not been triggered the method branches to step 705 and ends. In one embodiment of the present invention, a dialog box can be displayed indicating that the error check has been completed.

If, on the other hand, error checking has been triggered the method proceeds to decision block 704. At decision block 704, a determination is made as to whether an un-checked cell exists. If no unchecked cell exists, the method branches to step 705 and ends. If at least one unchecked cell exists, the method the branches to decision block 706.

At decision block 706, a determination is made as to whether the contents of the cell match a spreadsheet error rule. If the cell contents do not match a spreadsheet error rule, the method branches to step 712 and the cell is marked as having been checked. The method then proceeds back to decision block 704 to check for any other un-checked cells.

Returning now to decision block 706, if a determination is made that the contents of the cell match a spreadsheet error rule, then the method branches to step 708. At step 708, an error checking dialog box is displayed. The method then proceeds to decision block 710. At decision block 710, a determination is made as to whether a command has been selected from the error checking dialog box. If a command has not been selected, the method proceeds to step 705 and ends. If, on the other hand, a command has been selected, the method proceeds to step 716 and the selected command is processed. The method then branches to decision block 714.

At decision block 714, a determination is made as to whether the contents of the cell match a spreadsheet error rule. As discussed in connection with FIG. 6, this subsequent check of the cell contents is used to accommodate situations in which a cell has more than one identifiable error. If the contents of the cell match a spreadsheet error rule, the method branches to step 708 and proceeds as described above. If the contents of the cell do not match a spreadsheet error rule, then the method branches to step 712 and the cell is marked as having been checked. The method then proceeds to decision block 704 and further proceeds as described above.

FIG. 8 depicts a spreadsheet error table 800 matching an exemplary list of spreadsheet error types with exemplary recommended commands. Generally, the spreadsheet errors can be broken into two kinds. Impracticable errors are those errors for which a result cannot be calculated. Those errors are identified in the rule number column 802 by rule numbers 1A–1G. Impracticable errors include divide by O errors, value not available errors, invalid name errors, null errors, number errors, invalid cell reference errors, and error in value errors. The result of the error can be the string shown in the error type column 804 corresponding to rule numbers 1A–1G.

The OOC error string column 806 contains the text strings that can be displayed in connection with each of the identified error types. These strings can be displayed in the error string portion of the OOC, as described in connection with FIG. 3. Similarly, the dialog error string column 808 shows the text that can be displayed in connection with the error checking dialog box 400 discussed in connection with FIG. 4. The first recommended command column 810 and the second recommended command column 812 set forth the recommended commands that can be made available in the OOC and/or error checking dialog box.

Column 814 contains a list of alternative second recommended commands. In the cases of errors corresponding to rules numbers 1A–1G, the errors may be errors that actually reside in another cell. However, for various reasons, the error may be propagated to the present cell. In such cases, the second recommended command may be chosen from column 814, instead of column 812. As is clear from FIG. 8, an exemplary alternative second command enables the error to be traced to the cell that is accountable for the propagated error.

The error checker also identifies another kind of error referred to as defective spreadsheet errors, which are those spreadsheet errors that exist in a spreadsheet cell, but do not prevent the spreadsheet editor from calculating a value for the cell. Defective spreadsheet errors include references to empty cells, numbers stored as text, formulas that omit adjacent cells, inconsistent formulas, text dates with two digit year representations, and an unprotected cell containing a formula. One of the great advantages of the error checker that is an exemplary embodiment of the present invention is that it can identify defective spreadsheet errors that might otherwise be missed by a spreadsheet user.

The second spreadsheet error rule identifies formulas referring to empty cells. The first recommended command to resolve this error is to trace the empty cell, as indicated in the first recommended command column 810. Tracing the empty cell can identify the empty cell by drawing an arrow (or other indicator) from the empty cell to the cell containing the error. The second recommended command for this error is to provide help related to the error.

The third spreadsheet error rule identifies cells containing numbers that are stored as text. What appears to be a number in a cell can be stored as text or another non-numeric data type. When the error checker identifies this condition, it offers a first recommended command of converting the text to a number. The second recommended command is to provide help information related to converting ranges of text to a numeric data type.

The fourth spreadsheet error rule identifies cells that contain formulas that omit adjacent cells. The first recommended command is to update the formula to refer to additional cells that would be expected to be referred to by the formula. The second recommended command is provide help related to this spreadsheet error.

The fifth spreadsheet error type identifies cells containing inconsistent formulas. That is, the rule identifies cells that have formulas that differ from other formulas in the same area of the spreadsheet. The first recommended command for this spreadsheet error is to copy the formula from an adjacent, similar formula. The second recommended command is to provide help related to this error.

The sixth spreadsheet error type identifies cells that contain text dates having two digit years. The first recommended command for this spreadsheet error is to convert the two digit year to a four digit year with "19" as the first two digits (i.e., XX to 19XX). The second recommended command for this spreadsheet error is to convert the two digit text date to a four digit year with "20" as the first two digits (i.e., XX to 20XX).

The seventh spreadsheet error type identifies cells that contain a formula but are unprotected. One method to reduce errors is to protect all cells containing formulas to prevent them from being modified. The first recommended command for this spreadsheet error type is to lock (or protect) the identified cell. The second recommended command is to provide help related to this error.

As discussed above in connection with FIG. 5, those skilled in the art will appreciate that the list of spreadsheet errors provided herein is merely illustrative. Various other spreadsheet errors can be identified and resolved, ignored, and/or analyzed by use of the error checker described herein, regardless of any particular spreadsheet error.

In an exemplary embodiment of the present invention, the spreadsheet error rules can be prioritized such that they are applied to each cell in a particular order. As discussed above, each cell in a worksheet can potentially violate any or all of the spreadsheet error rules. When a cell violates more than one rule, the errors can be prioritized as they are applied to the cell in question. Thus, the OOC drop-down menu can show the available commands, including the recommended commands, for the highest priority rule that the particular cell is violating. To see other errors in the cell, the user may be required to dispose of the higher priority errors by resolving the errors or ignoring the errors. Cells that violate more than one rule may be identified with the same error indicator, or a separate indicator may be used to identify such cells. Nonetheless, even after a first error is resolved, a cell may be displayed with the error indicator if the cell still violates one or more spreadsheet error rules. Referring again to FIG. 8, the rule numbers shown in the rule number column 802 can be prioritized in the following order: 1, 6, 3, 5, 4, 7, 2.

In an exemplary embodiment of the present invention, the error checker is created as an object or component that can be accessed by other objects or components. Thus, various properties of the error checking object can be determined and/or set by an external component. Appendix A contains a table identifying various properties of the error checker object that can be accessed and the action that can result from an external component accessing an ErrorCheckingOptions Object. Appendix A also includes a table identifying various properties of the error checkerobject that can be accessed and the action that can result from an external component accessing an Errors Object. Generally, an external object must identify a spreadsheet document and a cell range to properly evaluate the requested property.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

APPENDIX A

| Property | Action |
|---|---|
| ErrorCheckingOptions Object Properties | |
| EvaluateToError Property | TRUE if the Evaluate To Error Value rule is enabled. |
| TextDate Property | TRUE if the Text Date with 2-digit year rule is enabled. |
| NumberAsText Property | TRUE if the Number stored as text rule is enabled. |
| InconsistentFormula Property | TRUE if the Inconsistent formula in region rule is enabled. |
| OmittedCells Property | TRUE if the Formula omits cells in region rule is enabled. |
| UnlockedFormulaCells Property | TRUE if the Unlocked cells containing formulas rule is enabled. |
| EmptyCellReferences Property | TRUE if the Formulas referring to empty cells rule is enabled. |
| BackgroundChecking Property | TRUE if Background Error Checking is enabled. |
| IndicatorColorIndex Property | Returns or sets the color of the Background Error Checking Indicator. |
| Errors Object Properties | |
| Ignore Property | Get/Set state of ignore flag per rule |
| Value Property | Get error state per rule |
| Parent Property | Returns parent of Errors collection object |

What is claimed is:

1. A computer-implemented method for checking a cell in a spreadsheet document for errors of calculation caused by the spreadsheet and displayed in the cell, the method comprising the steps of:
comparing a value calculated by the spreadsheet and displayed in the cell to a spreadsheet error rule, to determine whether the displayed value matches the spreadsheet error rule;
associating an error indicator with the cell, in response to a determination that the calculated value matches the spreadsheet error rule, wherein the error indicator is rendered within the cell in addition to any error of calculation displayed in the cell;
providing a selectable recommended command for modifying the calculated value, so that the calculated value does not match the spreadsheet error rule; and
modifying the calculated value, so that the calculated value does not match the spreadsheet error rule, in response to a selection of the selectable recommended command.

2. A computer readable medium having stored thereon computer-executable instructions for performing the method of claim 1.

3. The method of claim 1, wherein the spreadsheet error rule is one of a plurality of spreadsheet error rules maintained in a spreadsheet rules component.

4. The method of claim 1, wherein the error indicator is associated with a control, the control being operative to provide a drop-down menu.

5. The method of claim 4, wherein the drop-down menu contains the selectable recommended command.

6. The method of claim 4, wherein the drop-down menu contains a help command, an ignore error command, an edit in formula bar command, and a show formula auditing toolbar command.

7. The method of claim 1, wherein the spreadsheet error rule can be disabled by a checkbox in an options dialog box.

8. The method of claim 1, wherein the error of calculation comprises an error of defective calculation that results in an erroneous value displayed in the cell.

9. A computer-implemented error checker for checking a cell in a spreadsheet document for errors of calculation caused by the spreadsheet and displayed in the cell, the error checker comprising:
a spreadsheet rules component operative to compare a value calculated by the spreadsheet and displayed in the cell to a plurality of spreadsheet error rules to determine whether a match exists;
a recommended commands component operative to associate at least one recommended command with each spreadsheet error rule for which a match is determined; and
a user interface rendering component operative to associate an error indicator with the cell in addition to any error of calculation in a calculated value displayed in the cell and to provide a selectable list of commands, the list including the at least one recommended command.

10. The error checker of claim 9, wherein the plurality of spreadsheet error rules includes a rule for determining whether the cell includes a reference to an empty cell.

11. The error checker of claim 10, wherein the at least one recommended command is a command to identify the empty cell.

12. The error checker of claim 9, wherein the plurality of spreadsheet error rules includes a rule for determining whether the cell includes a number stored as text.

13. The error checker of claim 12, wherein the at least one recommended command is a command to convert the number stored as text to a numeric representation.

14. The error checker of claim 9, wherein the plurality of spreadsheet error rules includes a rule for determining whether the cell includes a formula that omits adjacent cells.

15. The error checker of claim 14, wherein the at least one recommended command is a command to modify the formula to refer to the adjacent cells.

16. The error checker of claim 9, wherein the plurality of spreadsheet error rules includes a rule for determining whether the cell includes an inconsistent formula.

17. The error checker of claim 16, wherein the at least one recommended command is a command to copy an adjacent formula into the cell.

18. The error checker of claim 17, wherein the plurality of spreadsheet error rules includes a rule for determining whether the cell includes a text date with a two digit year representation.

19. The error checker of claim 18, wherein the at least one recommended command is a command to convert the text date with a two digit year representation to a four digit representation.

20. The error checker of claim 9, wherein the plurality of spreadsheet error rules includes a rule for determining whether the cell includes a formula and is an unprotected cell.

21. The error checker of claim 20, wherein the at least one recommended command is a command to protect the cell.

* * * * *